United States Patent
Riedy et al.

(10) Patent No.: US 9,697,152 B1
(45) Date of Patent: Jul. 4, 2017

(54) I/O PROCESSING SYSTEM INCLUDING DYNAMIC MISSING INTERRUPT AND INPUT/OUTPUT DETECTION

(71) Applicant: International Business Machines Corporation, Armonk, NY (US)

(72) Inventors: Dale F. Riedy, Poughkeepsie, NY (US); Harry M. Yudenfriend, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/988,886

(22) Filed: Jan. 6, 2016

(51) Int. Cl.
*G06F 1/14* (2006.01)
*G06F 13/24* (2006.01)
*G05B 19/042* (2006.01)
*G06F 3/06* (2006.01)
*G06F 13/12* (2006.01)

(52) U.S. Cl.
CPC ......... *G06F 13/24* (2013.01); *G05B 19/0423* (2013.01); *G06F 3/068* (2013.01); *G06F 3/0611* (2013.01); *G06F 3/0659* (2013.01); *G06F 13/126* (2013.01)

(58) Field of Classification Search
CPC ...... G06F 13/24; G06F 13/126; G06F 3/0611; G06F 3/0659; G06F 3/068; G05B 19/0423
See application file for complete search history.

(56) References Cited

U.S. PATENT DOCUMENTS

| | | | |
|---|---|---|---|
| 5,461,721 A | 10/1995 | Cormier et al. | |
| 5,526,484 A | 6/1996 | Casper et al. | |
| 5,758,190 A | 5/1998 | Johnson et al. | |
| 5,768,620 A | 6/1998 | Johnson et al. | |
| 7,506,218 B2* | 3/2009 | Gilgen | G06F 13/24 |
| | | | 710/20 |
| 8,055,817 B2 | 11/2011 | Higgs et al. | |
| 8,843,673 B2 | 9/2014 | Mealey et al. | |
| 2007/0101193 A1* | 5/2007 | Johnson | G06F 1/26 |
| | | | 714/25 |
| 2012/0317391 A1* | 12/2012 | Driever | G06F 12/0246 |
| | | | 711/200 |

OTHER PUBLICATIONS

"IBM® z/Architecture Principles of Operation," Publication No. SA22-7832-05, 6th Edition, Apr. 2007, pp. 29-971.
IBM et al., "Data Processor Real Time Input Output/Channel", Jan. 1, 1977, TDB Jan. 1977 pp. 3005-3011.
IBM et al., "Missing Interrupt Detection by Channels" Nov. 1, 1978, TDB Nov. 1978, p. 2471.

* cited by examiner

*Primary Examiner* — Henry Tsai
*Assistant Examiner* — John Roche
(74) *Attorney, Agent, or Firm* — Cantor Colburn LLP; William A. Kinnaman, Jr.

(57) ABSTRACT

An I/O processing system includes an operating system configured to control an input/output (I/O) device, which executes an I/O operation in the I/O processing system. The I/O processing system further includes a channel subsystem module configured to output an interrogation command signal while the I/O device executes an I/O request. The I/O device returns an I/O status signal indicating a status of an ongoing I/O request, and the operating system is configured to dynamically determine a timeout event of the I/O request based on the status of the ongoing I/O request.

19 Claims, 3 Drawing Sheets

I/O PROCESSING SYSTEM INCLUDING DYNAMIC MISSING INTERRUPT AND INPUT/OUTPUT DETECTION

BACKGROUND

The present invention relates to generally input/output processing of an electronic data system, more specifically, to input/output request timeout management.

Electronic data systems typically employ input/output (I/O) request schemes to add, update and manage I/O devices implemented in the system. When an I/O request (i.e., I/O process) is issued to a device, the system may optionally monitor a time of the I/O request and take one or more actions when a missing interrupt occurs, i.e., when the time expires. These actions could include, for example, issuing a message, collecting/logging diagnostic information, terminating the I/O request, performing device recovery in attempt to correct the problem, or swapping over to an alternate device. The amount of time the system waits can either be provided by the application, the customer via configuration parameters, and/or from the device itself. The device may provide multiple time out values to allow different types of I/O requests to be timed differently. For example, there might be a primary I/O timeout value for short running commands and a secondary I/O timeout value for long running commands. There are a number of issues regarding the use of the timeout values.

First, the timeout values are based on the maximum amount of time it would require to complete an I/O request, taking into consideration any device related recovery that is required. For example, the timeout value for a direct access storage device (DASD) is 30 seconds, which is orders of magnitude higher than the amount of time required for a normal I/O operation to complete.

Second, there is no capability for the device to extend the amount of time the operating system (OS) should wait for an I/O request to complete. This becomes more of a problem when the gap between the primary and secondary timeout is very large. In the case of tape I/O requests, for example, the primary timeout value may be set at 30 seconds while the secondary timeout value may be set to 45 minutes to handle the worst case time for long running commands such as rewinding a tape. If what normally would be a short running command needs to be extended for a period of time, then either the secondary timeout value must be used, which means the application could be delayed for an extremely large amount of time, or the primary timeout needs to be changed to a higher value, which would affect all I/O requests.

Third, device specific code in the operating system may be used to extend the amount of time the operating system waits before declaring a timeout condition. It may be difficult, however, to determine the amount of time at which to extend the wait time. Without feedback from the device, there's no good way for the operating system to determine this value. Even if the device supplied a unique timeout value for every supported command, this is still an issue since some commands are variable in nature. For example, certain flashcopy and Peer to Peer Remote Copy (PPRC) commands may take longer than the DASD primary missing interrupt handler (MIH) time of 30 seconds. The actual amount of time required may be dependent on the volume size and disk technology used.

SUMMARY

According to a non-limiting embodiment, an I/O processing system includes an operating system configured to control an input/output (I/O) device, which executes an I/O operation in the I/O processing system. The I/O processing system further includes a channel subsystem module configured to output an interrogation command signal while the I/O device executes an I/O request. The I/O device returns an I/O status signal indicating a status of an ongoing I/O request, and the operating system is configured to dynamically determine a timeout event of the I/O request based on the status of the ongoing I/O request.

According to another non-limiting embodiment, a method of managing an input/output (I/O) request executed in an I/O processing system comprises executing the I/O request generated by a respective I/O device that is running according to an operating system (OS), and outputting an interrogation inquiry to the I/O device during execution of the I/O request. The method further includes receiving an I/O status reply indicating a status of the I/O request in response to the interrogation inquiry, and dynamically invoking an I/O request timeout event based on the status of the I/O request.

According to still another non-limiting embodiment, a computer program product manages an input/output (I/O) request executed in an I/O processing system. The computer program product comprises a computer readable storage medium having program instructions embodied therewith. The program instructions are executable by an electronic computer processor to perform operations comprising executing the I/O request generated by a respective I/O device running according to an operating system (OS), and outputting an interrogation inquiry to the I/O device during execution of the I/O request. The operations further comprises receiving an I/O status reply indicating a status of the I/O request in response to the interrogation inquiry, and dynamically invoking an I/O request timeout event based on the status of the I/O request.

Additional features are realized through the techniques of the present invention. Other embodiments are described in detail herein and are considered a part of the claimed invention. For a better understanding of the invention with the features, refer to the description and to the drawings.

DETAILED DESCRIPTION

Various non-limiting embodiments provide an I/O processing system including dynamic missing interrupt and I/O detection scheme capable of performing an active I/O request that obtains dynamic timeout information which allows the I/O detection system to actively manage an I/O request. In at least one embodiment, the dynamic timeout information is received directly from the I/O device in response to an interrogation command generated by the detection system. The dynamic timeout information may indicate the specific time at which the detection system should wait before declaring a timeout event, i.e., determining that a missing interrupt has occurred. The dynamic timeout information may also indicate a percentage of the I/O process left remaining. In this manner, the detection system may actively determine how to manage the I/O request. For example, if the completion percentage is less than or equal to a threshold value, the detection system may actively decide to allow the I/O request to continue. However, if the completion percentage exceeds the threshold value, the detection system may actively determine the existence of a timeout event. Following the timeout event, the detection system may invoke one or more recovery actions. In this manner, the dynamic missing interrupt and I/O detection system according to various non-limiting embodiments is capable of handling I/O requests that have variable completion times based on the current environment of the data system.

Figure 1:
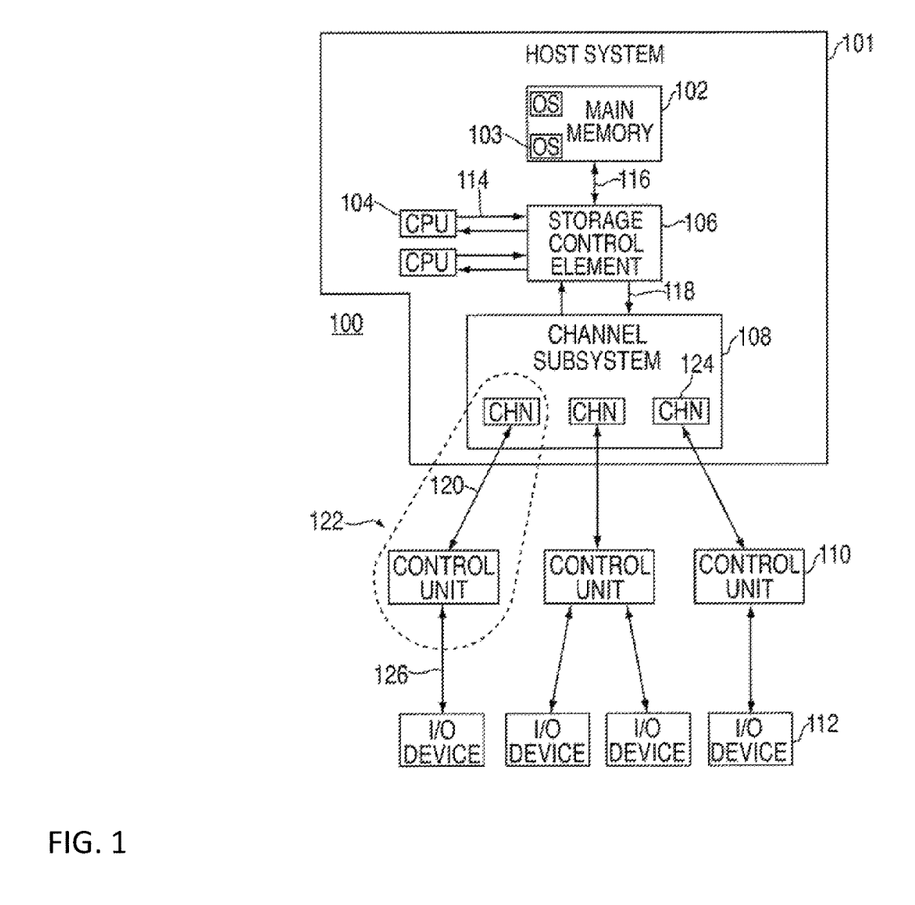
FIG. 1 is an example of an I/O processing system capable of implementing various non-limiting embodiments of the inventive teachings.

FIG. 1 illustrates an I/O processing system 100 configured to implement a dynamic missing interrupt and I/O detection scheme according to a non-limiting embodiment. The I/O processing system 100 includes a host system 101, which further includes for instance, a main memory 102, one or more central processing units (CPUs) 104, a storage control element 106, and a channel subsystem module 108 (i.e., channel subsystem 108). The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. The CPU 104 may configured as an electronic hardware control module and contains sequencing and processing facilities and logic circuitry for instruction execution, interruption action, timing functions, initial program loading, and other machine-related functions. CPU 104 is coupled to the storage control element 106 via a connection 114, such as a bidirectional or unidirectional bus, and drives an operating system (OS) 103 configured to dynamically determine a timeout event of the I/O request based on the status of the ongoing I/O request as discussed in greater detail below.

Storage control element 106 is coupled to the main memory 102 via a connection 116, such as a bus; to CPUs 104 via connection 114, and to the channel subsystem 108 via a connection 118. The storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fiber Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and host adapters (HA), through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control. Various exchanges and sequences may occur between a channel and a control unit when a channel program is executing. The link protocol used for the communications may be facilitated using, for example, a Fibre Connectivity (FICON) protocol. Information regarding FICON is described in "Fibre Channel Single Byte Command Code Sets-2 Mapping Protocol (FC-SB-3), T11/Project 1357-D/Rev. 1.6, INCITS (March 2003), which is hereby incorporated herein by reference in its entirety.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2:
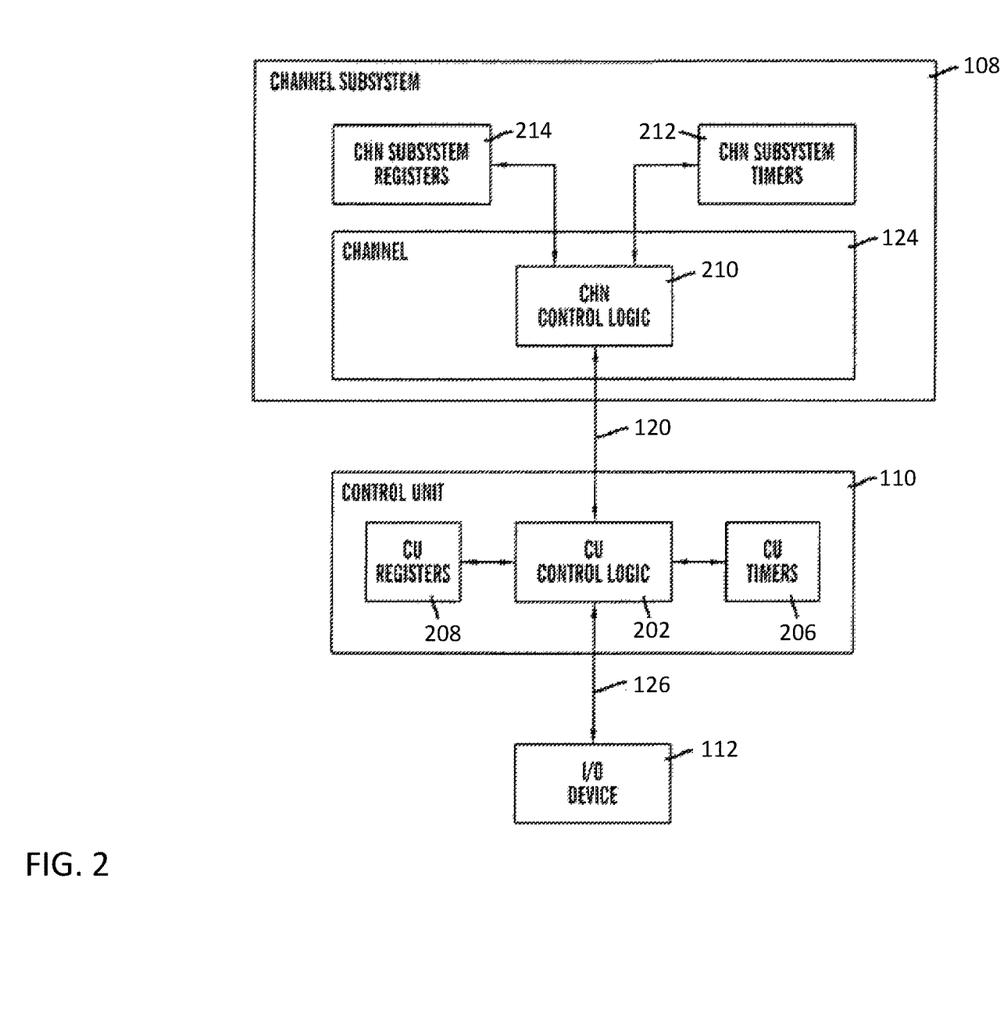
FIG. 2 is a block diagram illustrating control units, the channel subsystem module, and the I/O device according to a non-limiting embodiment.

With reference now to FIG. 2, the control unit 110 and the channel 124 of FIG. 1 configured to support a transport mode command I/O execution. According to at least one embodiment, the command word channel program execution includes a transport command word (TCW) channel program execution. The control unit 110 includes control unit (CU) control logic 202 to parse and process command messages containing a transport command control block (TCCB), for example, received from the channel 124 via the connection 120. The CU control logic 202 can extract commands words and control data from the TCCB received at the control unit 110 to control a devices, for instance, I/O device 112 via connection 126. In at least one embodiment, the control unit 110 executes multiple commands of the TCCB (e.g., define extent command, locate record command, read command as device control words (DCWs), for example, and forwards data to the channel 124.

In at least one embodiment, the CU 110 may receive command signals from the channel subsystem module 108 and relay the command signals to one or more I/O devices 112. For example, the CU 110 may detect an I/O request, and once initiated may inform the channel subsystem module 108 of the ongoing I/O request and the respective I/O device 112 that submitted the I/O request. In turn, the operating system (OS) module 101 may generate an interrogation command signal through the channel subsystem while the I/O device executes the I/O request. In at least one embodiment, the operating system module 101 generates the interrogation command signal a predetermined period of time following initiation of the I/O request. That is, the operating system module 101 is configured to detect the timeout condition and initiate the interrogate request via a special hardware instruction (e.g., cancel subchannel instruction). The channel subsystem 108 is configured to send the interrogate request to a respective I/O device 112 and process the I/O request status. The CU 110 receives the interrogation command signal via the connection 120, and relays the interrogate signal via connection 126 to the I/O device 112 executing the I/O request.

In response to receiving the interrogation command signal, the I/O device 112 generates an I/O status signal indicating a status of the ongoing I/O request, and the CU 110 relays the I/O status signal to the channel subsystem module 108. Based on the I/O status signal, the operating system dynamically determines a timeout event of the I/O request, i.e., dynamically detects a missing interrupt. That is, the occurrence of a timeout event may be dynamically determined based on the I/O status signal delivered by the I/O device 112 executing the respective I/O request. In this manner, the an amount of time available for the I/O device 112 to complete the I/O request may be dynamically extended before invoking a timeout event. When the operating system decides a timeout event exists, a recovery command signal is output to the control unit 110. The control unit 110 may then perform an action on the I/O device 112 based on the recovery signal. For example, the CU 110 may terminate the I/O request, temporarily halt I/O operations to the respective I/O device 112, etc., based on the recovery signal.

Turning now to FIG. 2, the control unit 110, the channel subsystem module 108, and the I/O device 112 are illustrated in greater detail. In at least one embodiment, the CU control logic 202 sends device commands and data to the I/O device 112, as well as receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 202 keeps track of and stores device busy messages and associated data in a device busy queue (not shown).

The CU control logic 202 can access and control other elements within the control unit 110, such as CU timers 206 and CU registers 208. The CU timers 206 may include multiple timer functions to track how much time a sequence of I/O operations takes to complete. The CU timers 206 may further include one or more countdown timers to monitor and abort I/O operations and commands that do not complete within a predetermined period. The CU registers 208 can include fixed values that provide configuration and status information, as well as dynamic status information that is updated as commands are executed by the CU control logic 202. The control unit 110 may further include other buffer or memory elements (not depicted) to store multiple messages or status information associated with communications between the channel 124 and the I/O device 112. The CU registers 208 may include a maximum control unit exchange parameter that defines the maximum number of open control unit exchanges that the control unit 110 supports.

The channel 124 in the channel subsystem module 108 includes multiple elements to support communication with the control unit 110. For example, the channel 124 may include a hardware control module configured to execute channel (CHN) control logic 210 that interfaces with CHN subsystem timers 212 and CHN subsystem registers 214. In an exemplary embodiment, the CHN control logic 210 controls communication between the channel subsystem module 108 and the control unit 110. The CHN control logic 210 may directly interface to the CU control logic 202 via the connection 120 to send commands and receive responses, such as transport command and response IUs. Alternatively, messaging interfaces and/or buffers (not depicted) can be placed between the CHN control logic 210 and the CU control logic 202. The CHN subsystem timers 212 may include multiple timer functions to track how much time a sequence of I/O operations takes to complete, in addition to the time tracked by the control unit I/O. The CHN subsystem timers 212 may further include one or more countdown timers to monitor and abort command sequences that do not complete within a predetermined period. The CHN subsystem registers 214 can include fixed values that provide configuration and status information, as well as dynamic status information, updated as commands are transported and responses are received.

According to at least one embodiment, the OS may perform an interrogation inquiry to one or more I/O devices 112 to determine the status of a respective I/O request. The information returned from the interrogate request contains the state of the operation (e.g., device is busy with another request, waiting for a Redundant Array of Independent Disk (RAID) rebuild, the device does not know about the I/O request) and sensed data that contains additional diagnostic information. In at least one embodiment, the information returned from the interrogate command contains information that allows the OS to extend the execution of the I/O operation. In this manner, an I/O device 112 to temporarily extend the amount of time waiting for an I/O request to complete. The timeout information includes, but is not limited to, extension of time data, percentage of I/O completion data, and recovery action information. The extension of time (EOT) data specifies the amount of time to delay before declaring a timeout condition or re-checking the state of the I/O operation. The percentage I/O completion value may provide host with data indicating an amount of the I/O request which has been completed, and/or how much of the request is left remaining. The recovery action information specifies one or more recovery actions that may be executed should a timeout event occur. The recovery actions include, but are not limited to:

reissue the interrogate request to recheck the status of the device after the specified amount of time elapses;

Terminate and optionally restart the I/O request;

Quiesce I/O to the device until the device indicates that it is ready by presenting some sort of state change or the time specified by the time out value elapses;

issue one or more device dependent commands to recover the device

One or more of the recovery actions may be initiated in the control unit 110. In at least one embodiment, the recovery action is generated directly from a respective I/O device 112. In addition, the recovery action selected by the I/O device 112 may be based on the current state of the I/O request. For example, the I/O device is aware of the type of I/O request being performed and/or the current rate at which the I/O request is being performed and may therefore determine or calculate the remaining amount of time before the I/O request is fully completed. In this manner, the I/O processing system 100 is provided with the ideal amount of time to wait before invoking a timeout event.

If the interrogate request is unsuccessful, one or more default action may be executed. The default action may include, for example, terminating and restarting the I/O request and performing device dependent recovery. If the interrogate command is successful, then recovery action(s) are used to determine whether the amount of time should be extended for the I/O request. The operating system may also have an upward bound of how long it will extend an I/O request before taking the default actions. For example, it may decide to allow the time to be extended a predetermined number of times (e.g., only once, twice, etc.) for each I/O request.

In at least one embodiment, the interrogation inquiry is facilitated using an expanded TCW such that an interrogation function may be employed. The interrogation function is achieved, for example, by implementing in the TCW for the I/O request an interrogate-TCW address field. The interrogate-TCW address field contains the address of another TCW and may be used by the channel 124 to interrogate the state of an operation under the initiative of a cancel sub-channel I/O instruction, explained in greater detail below.

According to at least one embodiment, the interrogate command/signal is issued using the same subchannel 124 (or device) as the one executing the I/O device 112, unlike traditional systems which allow only a single I/O request to execute on a subchannel at any point in time. That is, for transport mode operations, at least one embodiment includes an OS 103 configured to selectively initiate the interrogate command on the same subchannel/device as the one handling the active request that is taking too long.

To utilize a dynamic message intermediate header (MIH) function with command mode (CCW) operations (as well as providing an alternative for implementation for transport mode operations), at least one embodiment allows for the interrogate command/signal to be sent to another device in the control unit 110 (e.g., a proxy device), to interrogate the status of a different device (e.g., one where the timeout has been detected by the OS 103). The choice of proxy device may be restricted to those devices that the operating system 103 has initialized (e.g., established a path group with the control unit 110). The interrogate command in this case would contain information to identify the target device (e.g., the control unit logical address and unit address) so that the control unit 110 knows which device is being interrogated. In at least one embodiment, the interrogate command would not use the "interrogate TCW" technique used for transport mode operations; it would be a new type of CCW command. In at least one embodiment, the handling of the response from the interrogate command in the OS 103 is the same as when the interrogate command is initiated on the same subchannel/device that experienced the timeout condition as described in detail above.

In all computing environments, interrupts at various I/O devices 112 may occur. If an OS that requested an operation at an I/O device fails to detect an interrupt, this may cause operations in a data processing system to slow down and ultimately cease. A Missing Interrupt Handler (MIH) is a mechanism included, e.g., in the OS 103 that is useful in detecting delayed or lost interrupts by timing I/O operations that are in progress and determining whether the time taken by an I/O device 112 to execute an operation has exceeded a predetermined "normal" amount of time allotted or set for execution of the operation. If the MIH time is reached, and the I/O device 1121 has not completed execution of the operation, this is an indication that an interrupt may have been missed, a link failure occurred, an adapter failure occurred, a control unit error occurred, a reserve was held by a sharing system longer than expected, or other conditions exist which require the execution of the I/O request to go beyond the normal amount of time allotted.

According to at least one non-limiting embodiment, the I/O processing system 100 operates according to a high-performance fiber channel protocol (FICON such as, for example, a z High Performance (zHPF) FICON. Although a zHPF is described, it should be appreciated that the scheme according to various embodiments of the invention may be implemented according to any protocol that allows the I/O processing system 100 of the present teachings to communicate and receive a response from a target device. A target device includes, but is not limited to, a network connection and/or an application at the other end of a pipe.

The zHPF protocol allows the I/O processing system 100 to submit an I/O request and then subsequently send an interrogate command to one or more I/O devices 112 at a later time to determine the status of the I/O request. In at least one embodiment, the interrogate command may be initiated with a cancel subchannel instruction before the time allotted for completion of the execution of the I/O operation elapses, and the I/O operation has not completed.

There are several benefits of the interrogate command. One feature of the interrogate command is that it may query an I/O device 112 while a respective I/O request is active. In addition, the interrogate command is executed when a MIH timeout is about to occur, thereby removing the requirement for a command response (CMR) on every I/O operation. Removing the requirement for the CMR on every I/O operation improves fiber channel performance by reducing fabric traffic and channel and adapter overhead. Also, the interrogate command transfers information to the CU 110 about the OS for logging by the CU 110 if a timeout does occur. Another advantage is that the CU 110 provides detailed state information about the I/O operation back to the OS, whereas the CMR for FICON only indicates that the CU 110 is currently executing the I/O. Also, if an I/O operation is lost, the information exchanged by the interrogate command is very useful for problem determination.

Figure 3:
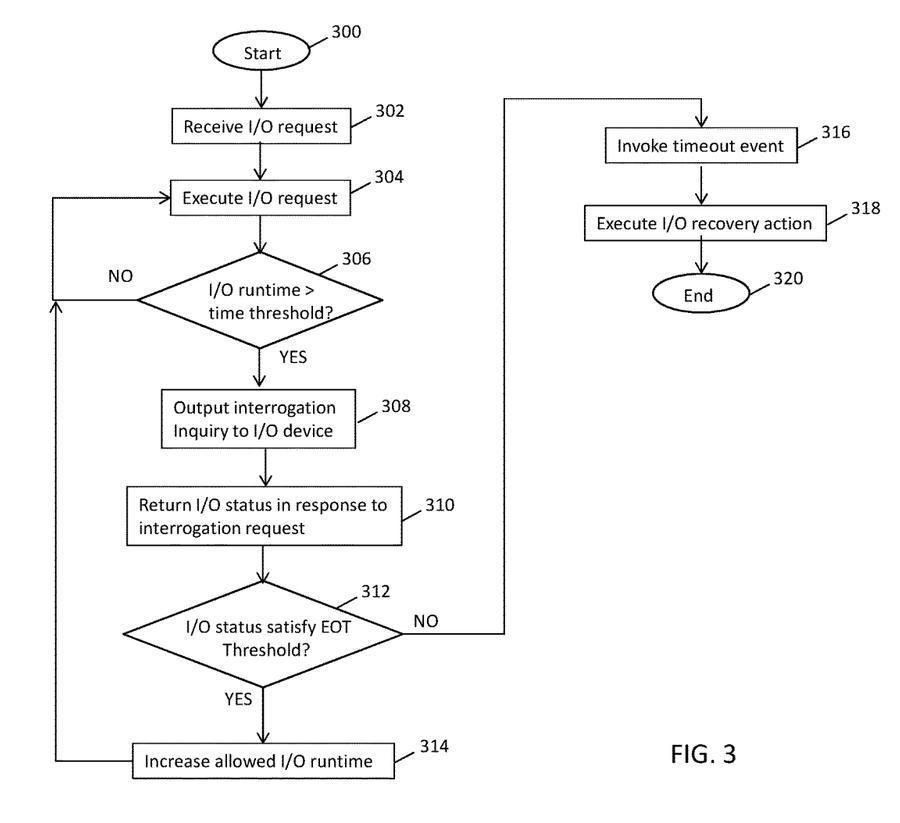
FIG. 3 is a flow diagram illustrating a method of managing an I/O request executed in an I/O processing system according to a non-limiting embodiment.

Turning now to FIG. 3, a flow diagram illustrates a method of managing an I/O request executed in an I/O processing system according to a non-limiting embodiment. The method begins at operation 300, and at operation 302 an I/O request is received. The I/O request is sent to a respective I/O device existing in the OS environment. At operation 304, the I/O request is executed. At operation 306, an I/O runtime is compared to a time threshold. That is, a time period from which the I/O request was first executed up to the current time period is compared to a time threshold. When the I/O runtime is less than or equal to the time threshold, the method returns to operation 304 and the I/O request is allowed to continue. When, however, the I/O runtime exceeds the time threshold, an output interrogation inquiry is output to the I/O device at operation 308.

At operation 310, the I/O device returns an I/O status reply in response to receiving the interrogation inquiry. The I/O status may include, but is not limited to, a request for an additional amount of runtime, a percentage of the I/O request currently completed, and/or an amount of time remaining before the I/O request is completed. At operation 312, the I/O status is compared to an extension of time (EOT) threshold. When the I/O status satisfies the EOT threshold, the I/O device is granted an additional amount of time to perform the I/O request at operation 314, and the method returns to operation 304 where execution of the I/O request is continued.

When, however, the I/O status does not satisfy the EOT threshold, a timeout event invoked (i.e., a missing interrupt is detected) at operation 316. At operation 318, one or more I/O recovery actions are performed, and the method ends at operation 320.

Accordingly, various non-limiting embodiments provide an I/O processing system including a dynamic missing interrupt and I/O detection scheme. The dynamic missing interrupt and I/O detection scheme issues an interrogate command for an active I/O request that obtains dynamic timeout information which allows the I/O detection system to actively manage an I/O request. The interrogate command may be issued to the I/O device that is processing the I/O request or it may be issued to a proxy I/O device. In at least one embodiment, the dynamic timeout information is received directly from the I/O device in response to an interrogation command generated by the detection system. Based on the timeout information, the I/O processing system may actively determine a timeout event of a respective I/O request. For example, the I/O processing system may actively determine whether to allow the I/O request to continue processing or to declare a timeout event exists and invoke one or more recovery actions. In this manner, the I/O processing system according to various non-limiting embodiments is capable of handling I/O requests that have variable completion times based on the current environment of the data system.

As used herein, the term "module" and/or "unit" refers to an application specific integrated circuit (ASIC), an electronic circuit, an electronic computer processor (shared, dedicated, or group) and memory that executes one or more software or firmware programs, a combinational logic circuit, a microcontroller, and/or other suitable components that provide the described functionality. When implemented in software, a module can be embodied in memory as a non-transitory machine-readable storage medium readable by a processing circuit and storing instructions for execution by the processing circuit for performing a method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An I/O processing system, comprising:
   an operating system including an electronic hardware processor configured to control an input/output (I/O) device, the I/O device configured to execute an I/O operation in the I/O processing system; and
   a channel subsystem module in signal communication with the operating system, the channel subsystem module including an electronic hardware processor configured to output an interrogation command signal while the I/O device executes an I/O request,
   wherein the I/O device returns an I/O status signal directly to the operating system indicating a status of an ongoing I/O request and extension of time (EOT) data specifying an amount of time to delay before declaring a timeout condition, and the operating system dynamically determines a timeout event of the I/O request based on the status of the ongoing I/O request, wherein dynamically determining the timeout event comprises dynamically extending the amount of time available for the I/O device to complete the I/O request to an extended time value that matches the amount of time specified by the EOT data, before invoking the timeout event.

2. The I/O processing system of claim 1, wherein the status of the ongoing I/O request includes a processing time period for completing the I/O request.

3. The I/O processing system of claim 2, wherein the operating system detects a missing interrupt and invokes the timeout event in response to the processing time period exceeding a timeout threshold value.

4. The I/O processing system of claim 1, wherein the status of the ongoing I/O request includes a completion value indicating a current amount of the I/O request completed.

5. The I/O processing system of claim 1, wherein the status of the ongoing I/O request includes a remaining time value indicating a processing time remaining before completing the I/O request, wherein the I/O device calculates the amount of time to delay based on the remaining time value, and outputs the EOT data including the calculated amount of time to delay directly to the operating system in response to the interrogation command signal.

6. The I/O processing system of claim 1, wherein the operating system executes a recovery action in response to invoking the timeout event.

7. The I/O processing system of claim 6, wherein the recovery action includes at least one of delaying for a period of time and reissuing the interrogation command signal, terminating the I/O request, initiating one or more recovery commands to the CU, and temporarily halting I/O process of the I/O device.

8. A method of managing an input/output (I/O) request executed in an I/O processing system, the method comprising:

executing, by the I/O processing system, the I/O request generated by a respective I/O device that is running according to an operating system;

outputting, by the I/O processing system, an interrogation inquiry to at least one of an I/O device processing an I/O request or a proxy device during execution of the I/O request;

receiving, at the I/O processing system, an I/O status reply directly from the respective I/O device indicating a status of the I/O request in response to the interrogation inquiry and extension of time (EOT) data specifying an amount of time to delay before declaring a timeout condition; and dynamically invoking, by the I/O processing system, an I/O request timeout event based on the status of the I/O request, wherein dynamically invoking the timeout event comprises dynamically extending the amount of time available for the I/O device to complete the I/O request to an extended time value that matches the amount of time specified by the EOT data, before invoking the timeout event.

9. The method of claim 8, further comprising outputting the interrogation inquiry based on a comparison between a current runtime of the I/O request and a time threshold.

10. The method of claim 8, wherein dynamically invoking the I/O request timeout event is based on a comparison between the status of the I/O request and an extension of time (EOT) threshold.

11. The method of claim 8, wherein the status of the I/O request is based on an environment of the data system.

12. The method of claim 10, further comprising increasing an allowed runtime of the I/O request in response to the status of the I/O request satisfying the EOT threshold.

13. The method of claim 12, further comprising detecting a missing interrupt and invoking the I/O timeout event in response to the status of the I/O request failing to satisfy the EOT threshold.

14. A computer program product to manage an input/output (I/O) request executed in an I/O processing system, the computer program product comprising a computer readable storage medium having program instructions embodied therewith, the program instructions executable by an electronic computer processor to perform operations comprising:

executing the I/O request generated by a respective I/O device running according to an operating system;

outputting an interrogation inquiry to the I/O device during execution of the I/O request;

receiving an I/O status reply directly from the respective I/O device indicating a status of the I/O request in response to the interrogation inquiry and extension of time (EOT) data specifying an amount of time to delay before declaring a timeout condition; and dynamically invoking an I/O request timeout event based on the status of the I/O request, wherein dynamically invoking the timeout event comprises dynamically extending the amount of time available for the I/O device to complete the I/O request to an extended time value that matches the amount of time specified by the EOT data, before invoking the timeout event.

15. The computer program product of claim 14, wherein the operations further comprise outputting the interrogation inquiry based on a comparison between a current runtime of the I/O request and a time threshold.

16. The computer program product of claim 14, wherein dynamically invoking the I/O request timeout event is based on a comparison between the status of the I/O request and an extension of time (EOT) threshold.

17. The computer program product of claim 14, wherein the status of the I/O request is based on an environment of the data system.

18. The computer program product of claim 16, wherein the operations further comprise increasing an allowed runtime of the I/O request in response to the status of the I/O request satisfying the EOT threshold.

19. The computer program product of claim 18, wherein the operations further comprise detecting a missing interrupt and invoking the I/O timeout event in response to the status of the I/O request failing to satisfy the EOT threshold.

* * * * *